(12) United States Patent
Meadows

(10) Patent No.: US 6,325,329 B1
(45) Date of Patent: Dec. 4, 2001

(54) HELIUM BALLOON

(75) Inventor: Joseph Stephen Meadows, Los Angeles, CA (US)

(73) Assignee: Joseph Steven Meadows, Los Angeles, CA (US)

( * ) Notice: Subject to any disclaimer, the term of this patent is extended or adjusted under 35 U.S.C. 154(b) by 0 days.

(21) Appl. No.: 09/590,598

(22) Filed: Jun. 9, 2000

Related U.S. Application Data

(60) Provisional application No. 60/138,755, filed on Jun. 11, 1999.

(51) Int. Cl.$^7$ .................................................. B64B 1/40
(52) U.S. Cl. ................................................ 244/31; 244/33
(58) Field of Search ................................. 244/31, 115, 33, 244/32, 64, 30, 24, 146, 99; 472/49, 131, 134, 133, 137, 50; 482/69, 77; 182/34

(56) References Cited

U.S. PATENT DOCUMENTS

| | | | |
|---|---|---|---|
| 1,186,580 | * | 6/1916 | Jelalian .................................. 244/64 |
| 1,247,960 | * | 11/1917 | Jelalian .................................. 244/64 |
| 1,305,592 | | 6/1919 | Fernandez . |
| 1,563,571 | * | 12/1925 | Huffman et al. ....................... 244/64 |
| 1,781,506 | * | 11/1930 | Godefroy ............................... 244/62 |
| 2,449,813 | * | 9/1948 | Lawson .................................. 244/24 |
| 4,061,293 | * | 12/1977 | Lo ......................................... 244/64 |
| 5,391,115 | * | 2/1995 | Bessey ................................... 472/80 |
| 5,449,130 | * | 9/1995 | Huntington ............................ 244/33 |
| 5,775,640 | | 7/1998 | Gobbi et al. . |

OTHER PUBLICATIONS

Screen Shots from the "Sky–Walking" web site, printed on Jan. 26, 2001.
Screen Shots from the "Zero G" web site, printed on Jan. 26, 2001.
Disney Productions, Movie—"Leap of Faith" 1985.

* cited by examiner

*Primary Examiner*—Charles T. Jordan
*Assistant Examiner*—Timothy D. Collins
(74) *Attorney, Agent, or Firm*—Hunton & Williams

(57) ABSTRACT

Disclosed is a helium balloon of sufficient volume and buoyancy to allow a human pilot to float above the ground and to glide over the ground. The balloon incorporates several safety features that permit it to be used for recreation, including tethers for keeping the balloon moored to the ground or controlled by a ground crew and various means for deflating the balloon in case of an emergency.

15 Claims, 5 Drawing Sheets

HELIUM BALLOON

CROSS REFERENCES TO RELATED APPLICATIONS

This application claims the benefit of U.S. Provisional Application No. 60/138,755, filed Jun. 11, 1999.

BACKGROUND OF THE INVENTION

1. Field of Invention

This invention relates generally to balloons filled with helium gas. More specifically, this invention relates to a helium balloon designed to carry a single person aloft.

2. Description of Related Art

People have used gas-filled balloons for transportation since the Montgolfier brothers, Joseph Michel and Jacques Etienne, invented the first hot air balloon in 1783. There have been hot air balloons designed to carry a single person. Such a contraption typically includes a compressed flammable gas tank strapped to the pilot's back and a burner above the pilot's head. The open flame needed for heating the air makes such a contraption relatively dangerous to use, however. Additionally, the burning gas pollutes the atmosphere, and the burner is quite noisy when in use. Moreover, the equipment associated with a single-person hot air balloon is prohibitively expensive to acquire and requires a truck to transport. And the diameter of a balloon needed to carry a single person is nearly 40 feet, making the balloon difficult to maneuver, especially in more crowded airspace. All of these disadvantages make such a contraption relatively undesirable and wholly impractical for widespread use by the public.

A helium-filled balloon overcomes these disadvantages. Helium gas is plentiful, non-flammable (and therefore safe) and environmentally friendly. Without a gas tank and a burner, a helium balloon is less expensive to acquire, and a deflated balloon can be transported by the pilot inside a passenger car. Finally, a helium balloon one-eighth the volume of a hot air balloon will lift the same weight so the diameter of the balloon for carrying a single person needs only to be 18–20 feet.

Even with these comparative advantages, however, helium balloons designed to carry a single person have seen only limited and obscure use in the past. In the early 1900s, people began using rubber balloons filled with helium gas for recreation. In this sport, men would hang precariously from nets strung over several helium balloons and race each other across large open areas as spectators placed bets on which pilot would be the winner. Perhaps because of the potential danger associated with a balloon puncture or a loss of grip, this sport never gained much popularity.

As recently as 1985, the movie "Leap of Faith" starring Steve Martin featured an untethered, one-man helium balloon. In the movie, the character played by Martin "flew" the balloon to rescue a small child from a dangerous balloon. What the movie does not show is the fact that an accident occurred during the filming. The balloon used in the production was not made from a rip-stop material. Rather, it consisted of a single layer of fabric and the attachment points for the harness used by the pilot were essentially glued to the underside of the balloon. As a result, the balloon tore as it hit the wall of the rock quarry where the girl in the film was to be rescued, and the stuntman piloting the balloon suffered a broken back. The production company destroyed the unsafe, poorly constructed balloon after the filming had concluded.

In 1995, U.S. Pat. No. 5,391,115 issued for an invention entitled "Low Gravity Jumping Apparatus." This invention discloses a helium balloon for providing a buoyant upward force but it does not provide any features for making the balloon safe for recreational use. Instead, the invention focuses on the design of a special harness and frame combination that allows the rider to rotate his or her body in a horizontal or vertical axis. The use of such a contraption only increases the risk associated with the activity.

With the increasing popularity of sports like bungee jumping and parasailing, it would be desirable to have a helium balloon designed to carry a single person aloft that adequately addresses issues of pilot safety, cost, portability, and safety to the environment. Such a contraption would provide the public with access to another recreational sport that offers the experience of floating and gliding. The invention described below meets the foregoing objectives.

BRIEF SUMMARY OF THE INVENTION

This invention is a helium-filled balloon made from strong rip-stop material and of a sufficient diameter (around 20 feet) and volume so that the balloon, when fully inflated, almost counteracts the effects of gravity on a pilot. A parachute-style harness secures the pilot to the balloon. By pushing off the ground with his or her legs, the pilot slowly ascends in the balloon to a maximum height of about 100 feet. Tether lines held by persons serving as the "ground crew" prevent the balloon from floating away or out of control. Once aloft, the pilot can float and glide for distances up to a quarter mile before gently descending. The balloon is equipped with bleed-off valves for controlled release of helium gas in the event of a navigational emergency. The entire balloon fits in the back seat or trunk of a passenger car.

BRIEF DESCRIPTION OF THE DRAWINGS

This invention is described in the following drawing figures.

DETAILED DESCRIPTION OF THE INVENTION

Figure 1:
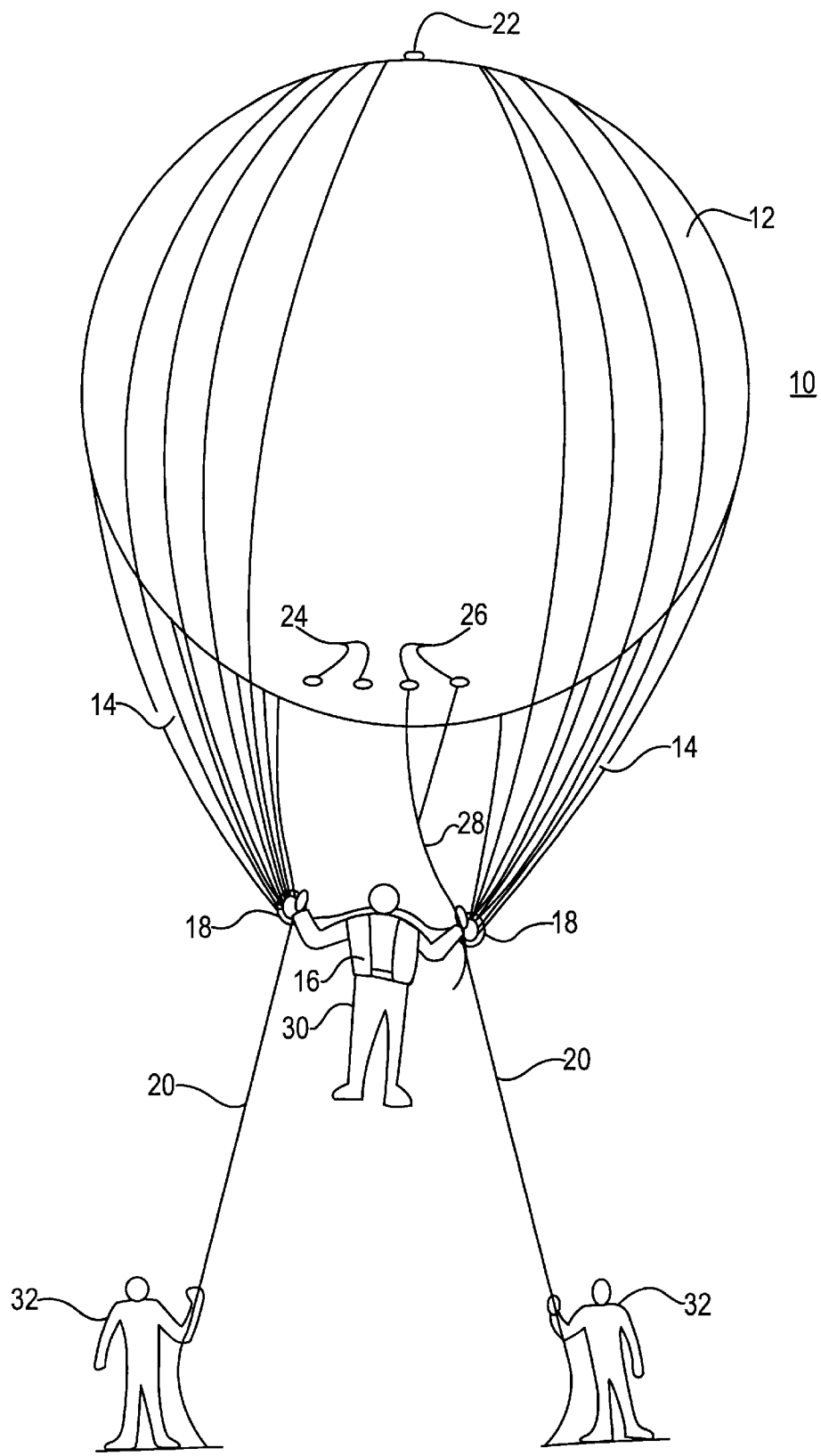
FIG. 1 is an environmental view of a helium balloon of the present invention;
2.

As seen in FIG. 1, a contraption of the present invention 10 comprises a balloon 12 with a plurality of test lines 14 secured to one another at one end and longitudinally disposed over the balloon 12. In the preferred embodiment, there are 16 continuous, 2000-lb test Spectra® lines, but the number used may vary with depending on the strength of the lines used. The test lines 14 are connected at the free end to a conventional parachute harness 16 by suitable fastening means 18, such as for example, locking carabiners. A minimum of two tether lines 20 are also secured to the fastening means 18 at one end. These tether lines will be of sufficient length to permit the balloon to float up to a desired gliding height, and yet keep the balloon moored to the ground. In the preferred embodiment, the tether lines are around 100 feet in length; this length allows the balloon to ascend to and glide at a height (below 150 feet) that does not violate current Federal Aviation Administration (FAA) regulations governing the maximum height of manned, moored balloons. See 14 CFR § 101.15.

A release valve 22 at the top of the balloon permits rapid deflation of the balloon after use. The balloon also has a plurality of fill valves 24, preferably two, and bleed-off valves 26, preferably three. The bleed-off valves 26 permit a pilot to effect a controlled release of helium gas in the event the balloon floats away or uncontrollably. The pilot operates the bleed-off valves 26 using a tug line 28 operatively connected to the valves.

FIG. 1 shows the invention 10 in use, with a pilot 30 strapped in the harness and two "ground crew" members 32 holding on to the tether lines. To ascend in the balloon, the pilot pushes off the ground with his or her legs, thereby propelling himself or herself upward. The resulting force, coupled with the buoyancy of the balloon, is sufficient to overcome the effects of gravity on the balloon and the pilot. Both the ascension and descension are gradual, however. The invention is designed for use in large open areas that provide sufficient room for floating and gliding over distances as much as a quarter mile or more with a single bound. Ideal conditions for use are low wind (0–5 miles per hour), clear weather with high visibility, and no precipitation. If the pilot does not want to glide for any distance in the balloon, the tether lines may be secured to the ground. Otherwise, the ground crew members simply follow the balloon as it glides in the air. Although the balloon is capable of untethered travel, such use would violate current FAA regulations that prohibit the unlicensed piloting of a lighter-than-air (LTA) aircraft. See 14 CFR §§ 61.3, 61.115. Thus, this invention permits safe recreational use of a helium balloon without the need for a pilot certificate or other permit.

Figure 2:
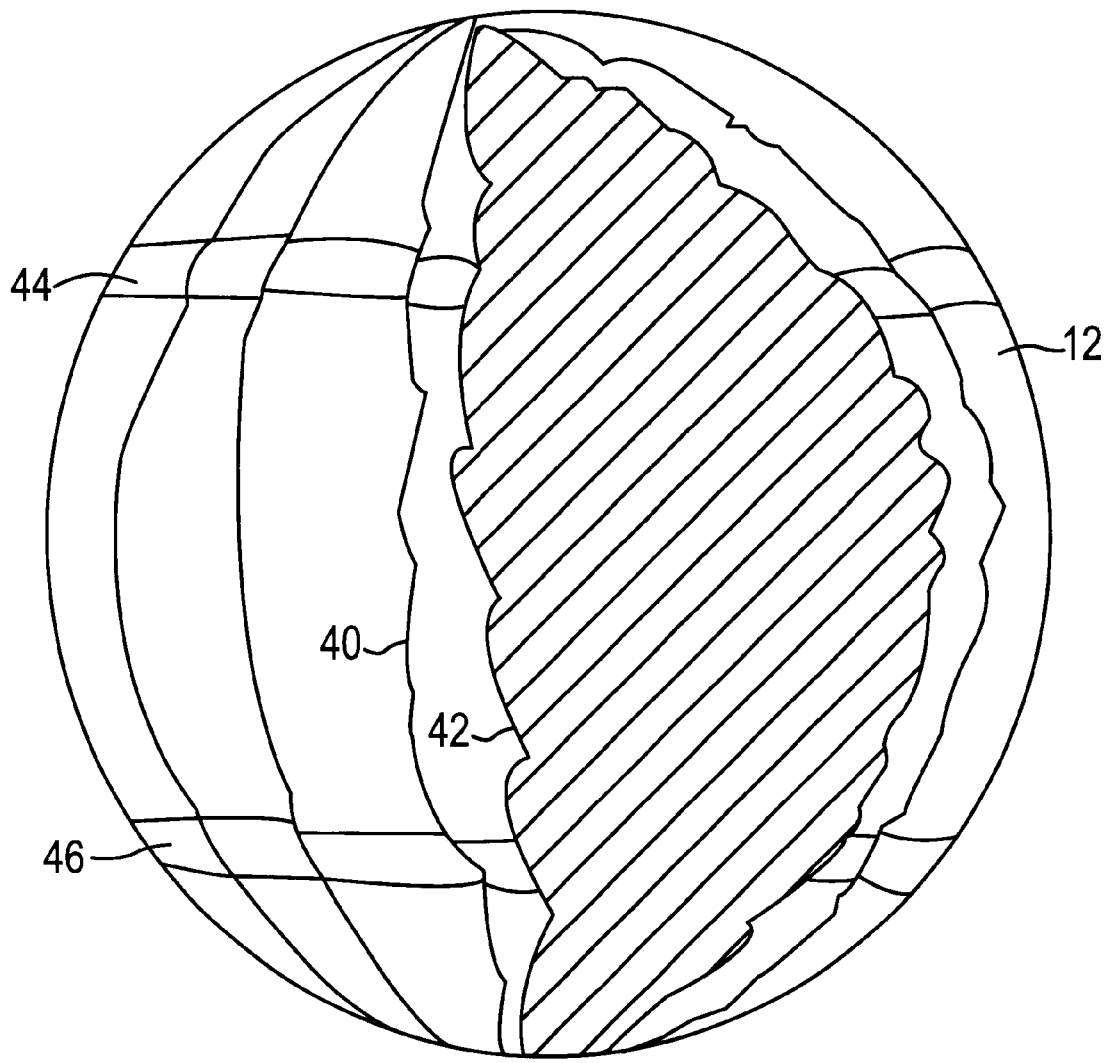
FIG. 2 is a partial cut-away view of the balloon;
3.

As seen in FIG. 2, the balloon 12 is preferably constructed from two layers of rip-stop nylon 40 and 42. The individual panels are seamed together using heat. Two nylon battens 44 and 46 latitudinally encircle the balloon 12 for additional reinforcement and strength. The balloon 12 is preferably about 20 feet in diameter and holds approximately 4,500 cubic feet of helium. The "double-balloon" construction minimizes the likelihood of a puncture or blowout because the outer layer is under very little pressure. In the unlikely event of a puncture, the double layers of rip-stop nylon would prevent rapid deflation, thereby providing for a gentle descent.

When deflated, the preferred embodiment of the invention weighs about 80 pounds. The entire rig for the invention can be stowed away in a three-foot by three-foot sail bag.

Figure 3:
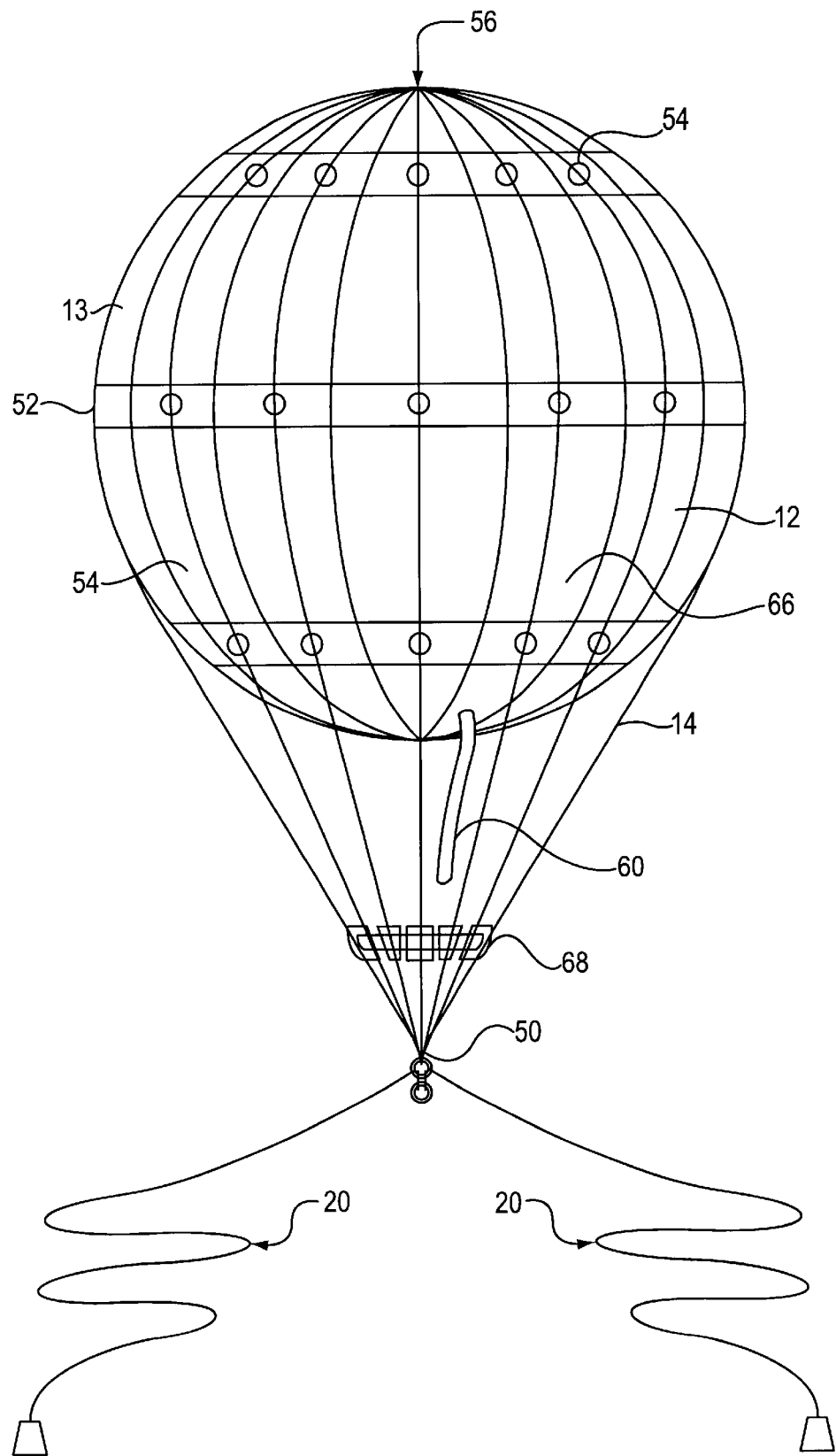
FIG. 3 is a side view of another embodiment of the balloon;
4.
Figure 4:
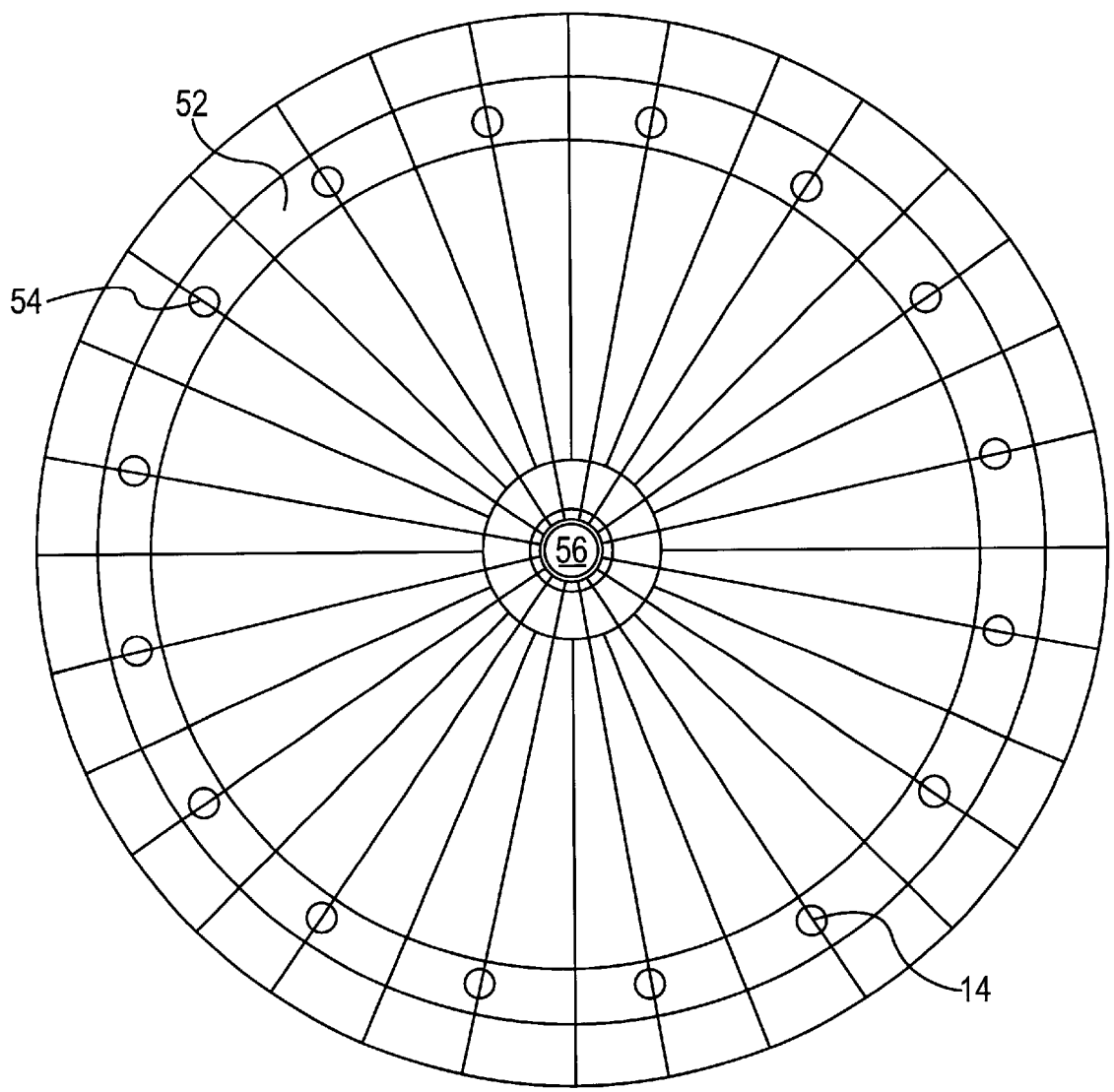
FIG. 4 is a top view of the same embodiment; and
5.
Figure 5:
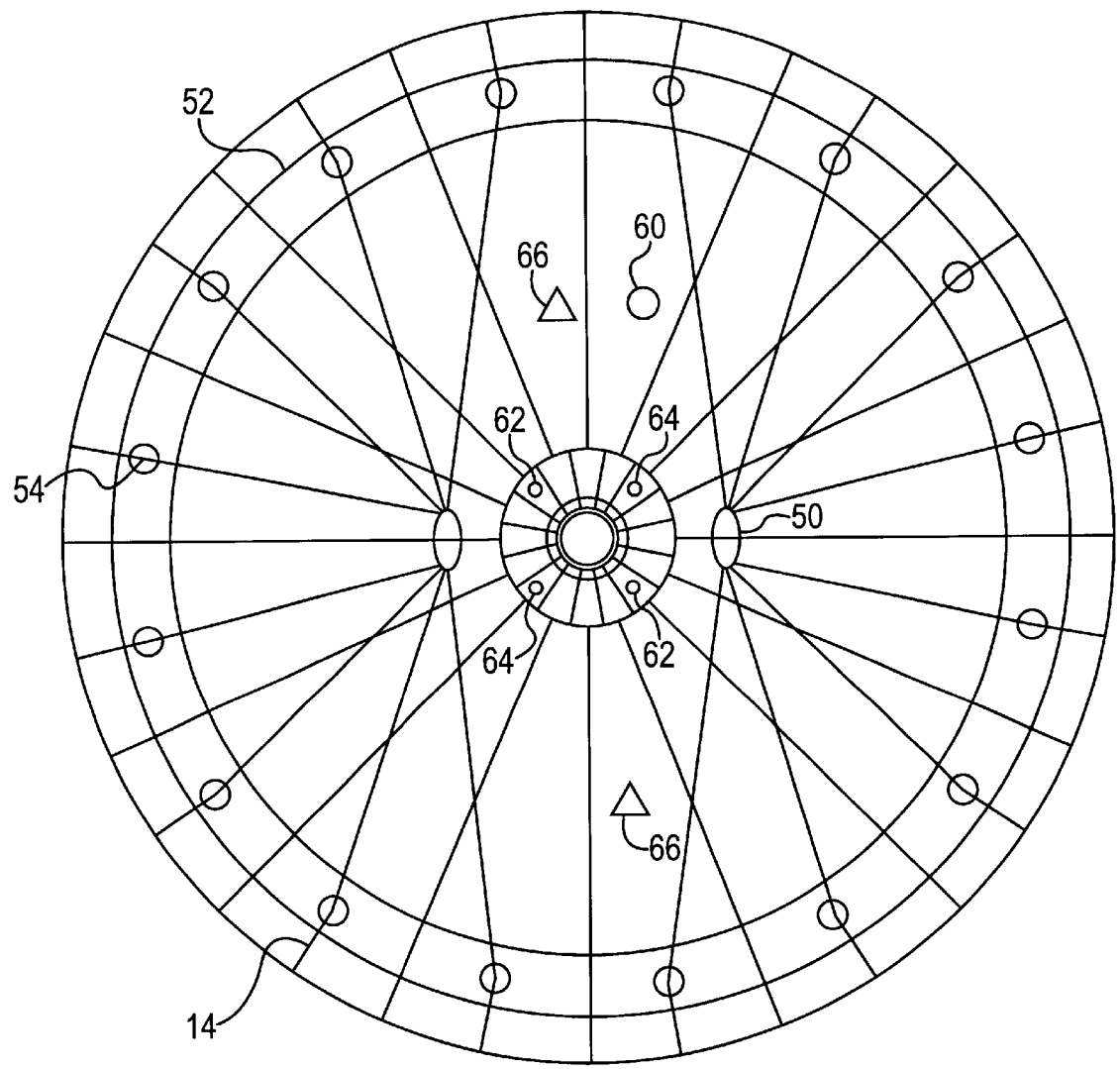
FIG. 5 is a bottom view of the same embodiment.

FIGS. 3–5 illustrate another preferred embodiment of the invention. Looking at FIG. 3 first, the invention 10 again comprises a balloon 12 with a plurality of test lines 14 longitudinally disposed over the balloon 12. The skin of the balloon 12 is preferably made from a polyurethane-coated nylon with overlapping seams 13. Again, there are preferably 16 continuous, 2000-lb test Spectra® lines, but the number used may vary with depending on the strength of the lines used. Half of the test lines 14 longitudinally disposed over one hemisphere of the balloon 12 are stitched together at their free ends around a steel ring 50. The other half of the test lines 14 are stitched together at their free ends around another steel ring 50, as seen in FIG. 5.

The interior of the balloon 12 is reinforced with a plurality of nylon battens 52 that latitudinally encircle the balloon 12. There are preferably three battens 52, as seen in FIG. 3. On the exterior of the balloon 12 and distributed along the latitudinal positions of the battens 52 are a plurality of guides 54 for keeping the test lines 14 positioned in even distribution around the balloon 12. The number of guides 54 will depend upon the number of test lines 14 and the number of battens 52; if there are 16 test lines 14 and three battens 52, as in the preferred embodiment, then there will be 48 guides 54. The test lines 14 are secured together at the top of the balloon 12 with two steel rings 56, as also seen in FIG. 4. The rings 56 are stacked one on top of the other. Half of the test lines 14 are secured to one ring 56 and the other half of the lines 14 to the other ring 56, in alternating order. In other words, the two test lines 14 to the immediate right and left of a third test line 14 will be secured to a different ring 56 from that for the third test line. The rings 56 are secured to the balloon 12 with nylon line or webbing (not shown).

The balloon 12 has a deflation zipper 58, as seen in FIG. 3, for complete deflation. There is a hose 60 for assisting with inflation and deflation of the balloon. The balloon has two intake ports 62, each with rubber stopper and cap, and two purge valves 64, each with a pull line, as seen in FIG. 5. There is also an emergency peel-off patch 66 covering a grommet (not shown). When the invention is in use, a pull line is secured to the grommet. The pilot can deflate the balloon quickly by pulling out the grommet.

If the invention will be used by more than one pilot, then canvas bags 68 of varying weights may be attached to the test lines 14, as seen in FIG. 3, to compensate for the difference in weight between pilots. The tether lines 20 are attached to the test lines 14 through the use of steel rings and locking carabiners (not shown). If a "ground crew" is used to hold on to the tether lines 20, the tether lines can be strapped to them using harnesses (not shown).

Various additional modifications of the invention described herein will occur to those skilled in the art. All such variations and deviations which basically rely on the teachings through which this invention has advanced the art are properly considered within the scope of this invention and equivalents thereof, as described herein and claimed in the appended claims.

I claim:

1. A device for floating and gliding, the device comprising:

an inflatable balloon having sufficient volume to carry a pilot aloft when it is inflated with helium gas;

a plurality of test lines secured to one another at one end and operatively connected to the balloon;

a parachute harness for the pilot;

a fastening means for securing the harness to the free end of the test lines; and a plurality of tether lines, wherein one end of each of the plurality of tether lines is secured to the harness, and the other end of each of the plurality of tether lines is directly secured to an individual on the ground such that the individual is able to move the respective tether line to permit manipulation of the balloon from the ground.

2. The device of claim 1, wherein the balloon comprises a layer of polyurethane-coated nylon.

3. The device of claim 1, wherein a deflation zipper is used to deflate the balloon.

4. The device of claim 1, wherein the test lines are secured to one another at one end by means of at least one ring.

5. The device of claim 1, wherein the fastening means is a locking carabiner.

6. The device of claim 1, wherein the other end of the at least one tether line is secured to a second harness.

7. A device for floating and gliding, such device comprising:

an inflatable balloon having sufficient volume to carry a pilot aloft when it is inflated with helium gas;

a plurality of test lines secured to one another at one end and operatively connected to the balloon;

a parachute harness for the pilot;

a fastening means for securing the harness to the free end of the test lines;

at least a ballast configuration comprising a ballast attachment means and at least one ballast weight attached to the ballast attachment means, wherein the ballast attachment means is attached to the plurality of test lines at a position above the pilot; and at least two tether lines, one end of each being operatively attached to at least one of the plurality of test lines.

8. The device of claim 7, wherein the balloon comprises a layer of polyurethane-coated nylon.

9. The device of claims 7, wherein a deflation zipper is used to deflate the balloon.

10. The device of claim 7, wherein the test lines are secured to one another at one end by means of at least one ring.

11. The device of claim 7, wherein the fastening means is a locking carabiner.

12. The device of claim 7, wherein the other end of each tether line is secured to at least one other harness.

13. The device of claim 7, wherein the at lease ballast weight includes a heavy duty fabric bag.

14. The device of claim 7, wherein the ballast attachment means comprises a ring.

15. The device of claim 7, wherein the ballast attachment means comprises a belt.

* * * * *